US012667987B2

(12) United States Patent
Tonne

(10) Patent No.: US 12,667,987 B2
(45) Date of Patent: Jun. 30, 2026

(54) POCKETKNIFE WITH ENHANCED SAFETY FEATURES

(71) Applicant: Quinn Tonne, Boone, IA (US)

(72) Inventor: Quinn Tonne, Boone, IA (US)

( * ) Notice: Subject to any disclaimer, the term of this patent is extended or adjusted under 35 U.S.C. 154(b) by 112 days.

(21) Appl. No.: 18/657,381

(22) Filed: May 7, 2024

(65) Prior Publication Data

US 2025/0345958 A1 Nov. 13, 2025

(51) Int. Cl.
B26B 11/00 (2006.01)
B26B 29/02 (2006.01)
G06F 21/32 (2013.01)

(52) U.S. Cl.
CPC ............ B26B 11/008 (2013.01); B26B 29/02 (2013.01); G06F 21/32 (2013.01)

(58) Field of Classification Search
CPC ........ B26B 11/008; B26B 29/02; G06F 21/32
See application file for complete search history.

(56) References Cited

U.S. PATENT DOCUMENTS

| | | | | | |
|---|---|---|---|---|---|
| 4,987,682 | A | * | 1/1991 | Minnick | B26B 29/025 |
| | | | | | 30/295 |
| 5,890,290 | A | * | 4/1999 | Davis | B26B 29/02 |
| | | | | | 30/162 |
| 6,044,565 | A | * | 4/2000 | Arend | B26B 29/02 |
| | | | | | 30/292 |
| 6,122,828 | A | * | 9/2000 | Asterino, Jr. | B26B 3/06 |
| | | | | | 30/286 |

| | | | | | |
|---|---|---|---|---|---|
| 6,543,140 | B1 | * | 4/2003 | Davis | B26B 5/001 |
| | | | | | 30/162 |
| D666,887 | S | * | 9/2012 | Wattenberg | D8/99 |
| 12,290,949 | B1 | * | 5/2025 | Abrams | B26B 5/005 |
| 2004/0128842 | A1 | * | 7/2004 | Alfi | B26B 29/02 |
| | | | | | 30/286 |
| 2004/0141313 | A1 | * | 7/2004 | Elsener | B25F 1/04 |
| | | | | | 7/118 |
| 2011/0289783 | A1 | * | 12/2011 | Polyakova | B26B 29/02 |
| | | | | | 30/151 |
| 2012/0124843 | A1 | * | 5/2012 | Reibold | B26B 29/02 |
| | | | | | 30/295 |
| 2013/0192069 | A1 | * | 8/2013 | Reibold | B26B 1/10 |
| | | | | | 30/295 |
| 2016/0214264 | A1 | * | 7/2016 | Garavaglia | B26B 29/02 |
| 2017/0080583 | A1 | * | 3/2017 | Esteban Gonzalez | |
| | | | | | B26B 11/008 |
| 2017/0086496 | A1 | * | 3/2017 | Cameron | B25F 1/04 |
| 2018/0186019 | A1 | * | 7/2018 | Fieil | B25G 1/102 |
| 2020/0156269 | A1 | * | 5/2020 | Sullivan | B26B 5/001 |
| 2022/0234224 | A1 | * | 7/2022 | Glesser | H02J 50/005 |
| 2022/0234225 | A1 | * | 7/2022 | Glesser | H02J 50/10 |
| 2022/0388186 | A1 | * | 12/2022 | King | B26B 7/00 |
| 2023/0008940 | A1 | * | 1/2023 | Kempker | B26B 1/10 |
| 2024/0033954 | A1 | * | 2/2024 | Fauss | B26B 5/001 |

* cited by examiner

*Primary Examiner* — Omar Flores Sanchez
(74) *Attorney, Agent, or Firm* — The Iwashko Law Firm, PLLC; Lev Ivan Gabriel Iwashko

(57) ABSTRACT

A pocketknife with enhanced safety features, including a blade, and a handle hingedly connected to the blade at a top portion of the handle, the handle including a blade compartment to receive the blade therein, and a pressure plate disposed on a first side of the handle to release the blade from the blade compartment when the pressure plate is pressed.

3 Claims, 2 Drawing Sheets

POCKETKNIFE WITH ENHANCED SAFETY FEATURES

BACKGROUND

1. Field

The present general inventive concept relates generally to a pocketknife, and particularly, to a pocketknife with enhanced safety features.

2. Description of the Related Art

Conventional pocketknives serve as a compact safety and/or utilization weapon, yet they are prone to accidentally opening when stored in pockets or bags, leading to injuries or unwanted access by others.

Considering conventional pocketknives pose a danger if misused, the ability to control the multi-purpose accessory is of essential interest to users.

Therefore, there is a need for a pocketknife that has enhanced safety features.

SUMMARY

The present general inventive concept provides a pocketknife with enhanced safety features.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a pocketknife with enhanced safety features, including a blade, and a handle hingedly connected to the blade at a top portion of the handle, the handle including a blade compartment to receive the blade therein, and a pressure plate disposed on a first side of the handle to release the blade from the blade compartment when the pressure plate is pressed.

The pressure plate may control the blade to be released from the blade compartment in response to a user providing a predetermined amount of pressure to the pressure plate.

The handle may further include a central processing unit disposed within the handle and connected to the pressure plate, such that the central processing unit stores a thumb print of a user to recognize the thumb print of the user in response to the user placing a thumb onto the pressure plate, such that the central processing unit controls the blade to be released from the blade compartment in response to the user placing the thumb onto the pressure plate.

The handle may further include a first retractable guard hingedly disposed at the top portion of the first side of the handle to swivel from a retracted state such that the first retractable guard is parallel to the handle, to an extended state such that the first retractable guard is perpendicular with respect to the handle, and a second retractable guard hingedly disposed at the top portion of a second side of the handle to swivel from a retracted state such that the second retractable guard is parallel to the handle, to an extended state such that the second retractable guard is perpendicular with respect to the handle.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1:
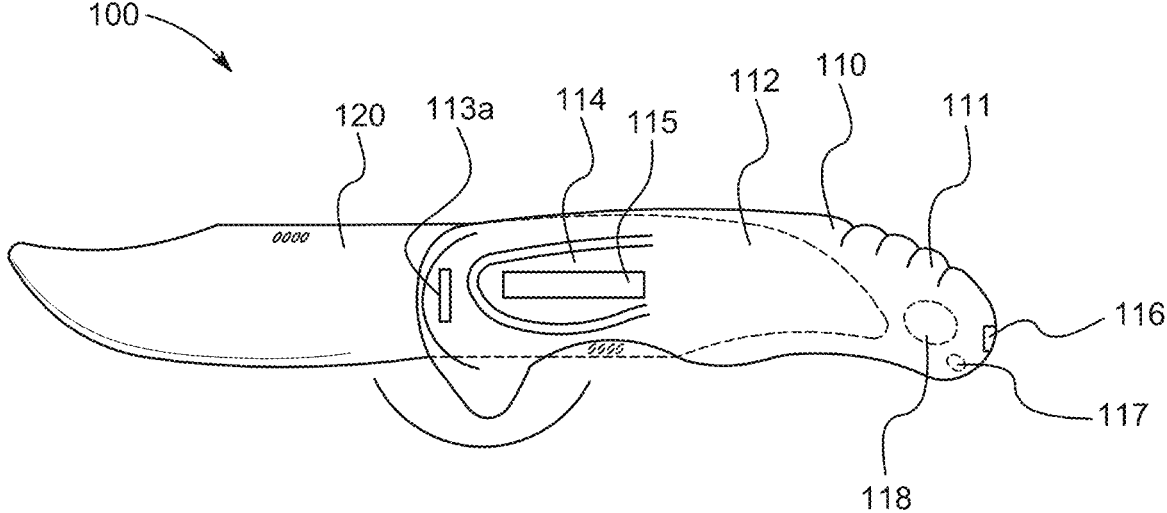
FIG. 1 illustrates side view of a pocketknife with enhanced safety features, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example e embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Pocketknife With Enhanced Safety Features 100
Handle 110

Grip 111

Blade Compartment 112

First Retractable Guard 113a

Second Retractable Guard 113b

Thumb Indentation 114

Pressure Plate 115

Charging Port 116

Battery 117

Central Processing Unit (CPU) 118

Belt Clip 119

Blade 120

FIG. 1 illustrates side view of a pocketknife with enhanced safety features 100, according to an exemplary embodiment of the present general inventive concept.

Figure 2:
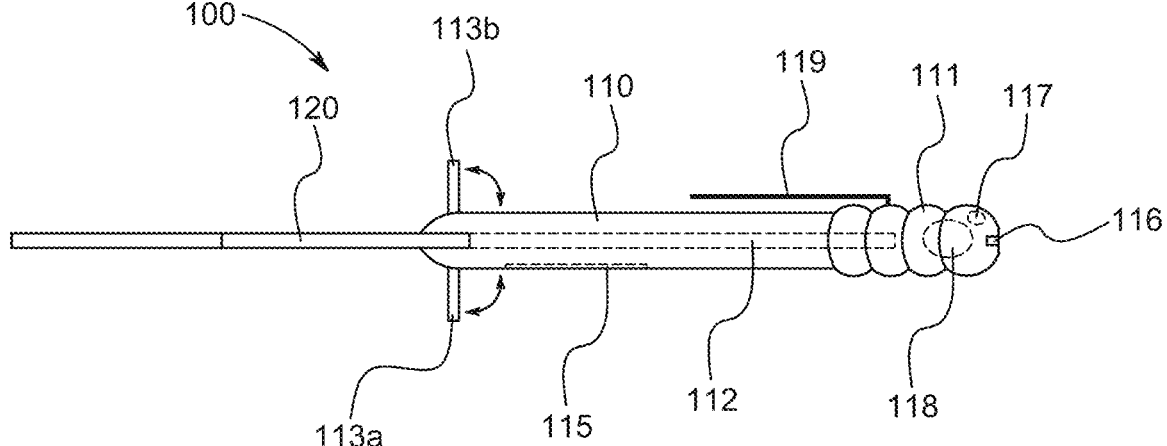
FIG. 2 illustrates top view of a pocketknife with enhanced safety features of FIG. 1, according to an exemplary embodiment of the present general inventive concept.

FIG. 2 illustrates top view of the pocketknife with enhanced safety features 100 of FIG. 1, according to an exemplary embodiment of the present general inventive concept.

The pocketknife with enhanced safety features 100, and all components therein and/or connected thereto, may be constructed from at least one of metal, plastic, stone, ceramics, wood, silicone, paper, cloth, circuitry, and rubber, etc., but is not limited thereto, and can be constructed from any material known to one of ordinary skill in the art.

Referring to FIGS. 1 and 2, the pocketknife with enhanced safety features 100 may include a handle 110 and a blade 120, but is not limited thereto.

The handle 110 may include a grip 111, a blade compartment 112, a first retractable guard 113a, a second retractable guard 113b, a thumb indentation 114, a pressure plate 115, a charging port 116, a battery 117, a central processing unit (CPU) 118, and a belt clip 119, but is not limited thereto.

The grip 111 may be a textured portion of the handle 110 to allow a user to more easily grip the handle 110, and may be disposed at an entirely of the handle 110 or only at a portion thereof.

The blade compartment 112 may be a groove (e.g., crevice, aperture, etc.) disposed within a side portion of the handle 110, and may act as a space to allow the blade 120 to be stored thereinside when the blade is folded inward toward the handle 110.

The first retractable guard 113a may be disposed at a top portion of the handle 110 at a first side thereof, and the second retractable guard 113b may be disposed at the top portion of the handle 110 at a second side thereof. The first retractable guard 113a and the second retractable guard 113b may be hindely connected to the top portions of the handle 110 to be able to be pressed against the first and second sides of the handle 110, respectively, when in a retracted state, such that the retractable guard 113a and the second retractable guard 113b are substantially parallel to the handle 110. The user may swivel the retractable guard 113a and the second retractable guard 113b ninety-degrees such that the retractable guard 113a and the second retractable guard 113b are perpendicular with respect to the handle 110, when in an extended state. When the retractable guard 113a and the second retractable guard 113b are in an extended state, the user is protected from a thumb sliding forward onto the blade 120 when manipulating the pocketknife with enhanced safety features 100.

The thumb indentation 114 may be an indentation on the first side portion of the handle 110, such that the user may have comfort when holding the handle 110.

The pressure plate 115 may be a button that the user may press to release the blade 120 from the blade compartment 112. The pressure plate 115 may be a pressure plate that mechanically releases the blade 120 from the blade compartment 112 when the pressure plate 115 is pressed. Alternatively, the pressure plate 115 may be a thumb print recognition device to allow the blade 120 to be released from the blade compartment 112 when the CPU 118 recognizes a thumb print of the user.

When the blade 120 is released from the blade compartment 112, the user may continue to rotate the blade 120 along a hinge point (i.e., a hinge point that connects the blade 120 to the handle 110), such that the blade 120 is fully extended to be substantially parallel and in-line with the handle 110.

The charging port 116 may be any type of charging port compatible with a charging cable to allow the battery 117 disposed within the handle 110 the be charged, including, but not limited to, USB-A, USB-B, USB-Mini, Micro-USB, USB-C, and Lightning Charge (APPLE products).

The battery 117 may be connected to the CPU 118 to provide electrical power thereto.

The CPU 118 may include electronic circuitry to carry out instructions of a computer program by performing basic arithmetic, logical, control and input/output (I/O) operations specified by the instructions. The CPU 118 may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The CPU 118 may also include a microprocessor and a microcontroller. The transmitter CPU 118 may be a local computer device, a remote server, or cloud computing device.

The CPU 118 may also include a storage unit, a random access memory (RAM), a read-only memory (ROM), a hard disk, a flash drive, a database connected to the Internet, cloud-based storage, Internet-based storage, or any other type of storage unit.

The CPU 118 may access the Internet via an internal communication unit to allow the CPU 118 to access a website, and/or may allow for communication with a mobile application and/or a software application. For ease of description, the mobile and/or the software application will be hereinafter referred to as an app. The app may be downloaded from the Internet to be stored on the storage unit of the CPU 118.

The CPU 118 may also have a global positioning service (GPS) device installed therein, to allow the CPU 118 to be located via a GPS signal.

Thus, the CPU 118 may communicate with an external computer, mobile device, or any other type of computer-type device, in order to allow the CPU 118 to save a thumb print of the user so that the CPU 118 recognizes the thumb print of the user when the user presses a thumb on the pressure plate 115.

The belt clip 119 may be disposed at the second side of the handle 110 to allow the user to clip the handle onto a belt, for example, of the user.

A main purpose of the present general inventive concept is to provide users with a highly advanced fingerprint-activated safety blade, designed to be paired with a user-friendly app. Ingenious and practical, the present general inventive concept offers an alternative design that employs fingerprint recognition and customizable safety settings to ensure only owners of the knife can operate the weapon. Expanding on the initial design of an average pocketknife, the present general inventive concept introduces a novel and comfortable groove thumbprint scanner on the handle. With the activation of a 10-15 pound pressure plate, which allows for an adjustable 1.5-3 second delay configuration via the complementary app, the present general inventive concept ensures intentional deployment based on thumbprint programming. This prevents accidental openings, guaranteeing that the blade is only accessible when needed by the primary owner. As the spring-loaded blade is released, two pegs on the handle's sides automatically pop up preventing slippage during use, offering additional protection for the owner, if/when thrusting. With advanced technology, users can customize the settings of the knife, including adjusting the pressure plate weight and time delay, as well as monitor battery life, allowing for a personalized experience and complete control of their weapon. Moreover, the present general inventive concept features a USB charge port at the base of the handle enhancing its reliability for extended use. This innovative, top-quality self-defense weapon improves upon the functionality and safety of any conventional pocket knife and therefore may prove to be essential in the safety industry.

A pocketknife with enhanced safety features 100, including a blade 120, and a handle 110 hingedly connected to the blade 120 at a top portion of the handle 110, the handle 110 including a blade compartment 112 to receive the blade 120 therein, and a pressure plate 115 disposed on a first side of the handle 110 to release the blade 120 from the blade compartment 112 when the pressure plate 115 is pressed.

The pressure plate 115 may control the blade 120 to be released from the blade compartment 112 in response to a user providing a predetermined amount of pressure to the pressure plate 115.

The handle 110 may further include a central processing unit 118 disposed within the handle 110 and connected to the pressure plate 115, such that the central processing unit 118 stores a thumb print of a user to recognize the thumb print of the user in response to the user placing a thumb onto the pressure plate 115, such that the central processing unit 118 controls the blade 120 to be released from the blade compartment 112 in response to the user placing the thumb onto the pressure plate 115.

The handle 110 may further include a first retractable guard 113a hingedly disposed at the top portion of the first side of the handle 110 to swivel from a retracted state such that the first retractable guard 113a is parallel to the handle 110, to an extended state such that the first retractable guard 113a is perpendicular with respect to the handle 110, and a second retractable guard 113b hingedly disposed at the top portion of a second side of the handle 110 to swivel from a retracted state such that the second retractable guard 113b is parallel to the handle 110, to an extended state such that the second retractable guard 113b is perpendicular with respect to the handle 110.

The present general inventive concept is the only product of its kind that features fingerprint recognition on a pocketknife to prevent unwanted access and/or premature exposure to the blade. This unprecedented product is uniquely designed with highly advanced scanning technology and offers a user-friendly app that works in complement with the blade for streamlined operation. The present general inventive concept is carefully crafted with durable, high-quality materials that ensure a user consciously intends to use the weapon, at an exact time, to either complete a task or when suitable for their safety.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A pocketknife with enhanced safety features, comprising:

a blade; and a handle hingedly connected to the blade at a top portion of the handle, the handle comprising:

a blade compartment to receive the blade therein, a pressure plate disposed on a first side of the handle to release the blade from the blade compartment when the pressure plate is pressed, and a central processing unit disposed within the handle and connected to the pressure plate, such that the central processing unit stores a thumb print of a user to recognize the thumb print of the user in response to the user placing a thumb onto the pressure plate, such that the central processing unit controls the blade to be released from the blade compartment in response to the user placing the thumb onto the pressure plate, wherein the user must place the thumb onto the pressure plate for at least three seconds in order to allow the blade to be released from the blade compartment.

2. The pocketknife with enhanced safety features of claim 1, wherein the pressure plate controls the blade to be released from the blade compartment in response to a user providing a predetermined amount of pressure to the pressure plate.

3. The pocketknife with enhanced safety features of claim 1, where in the handle further comprises:

a first retractable guard hingedly disposed at the top portion of the first side of the handle to swivel from a retracted state such that the first retractable guard is parallel to the handle, to an extended state such that the first retractable guard is perpendicular with respect to the handle; and a second retractable guard hingedly disposed at the top portion of a second side of the handle to swivel from a retracted state such that the second retractable guard is parallel to the handle, to an extended state such that the second retractable guard is perpendicular with respect to the handle.

* * * * *